Nov. 22, 1955     H. F. STORM     2,724,797
STABILIZING CIRCUIT FOR ALTERNATING CURRENT GENERATOR
Filed Feb. 1, 1951     2 Sheets—Sheet 1

Inventor:
Herbert F. Storm,
by *Claude H. Mott*
His Attorney.

Nov. 22, 1955     H. F. STORM     2,724,797
STABILIZING CIRCUIT FOR ALTERNATING CURRENT GENERATOR
Filed Feb. 1, 1951     2 Sheets-Sheet 2
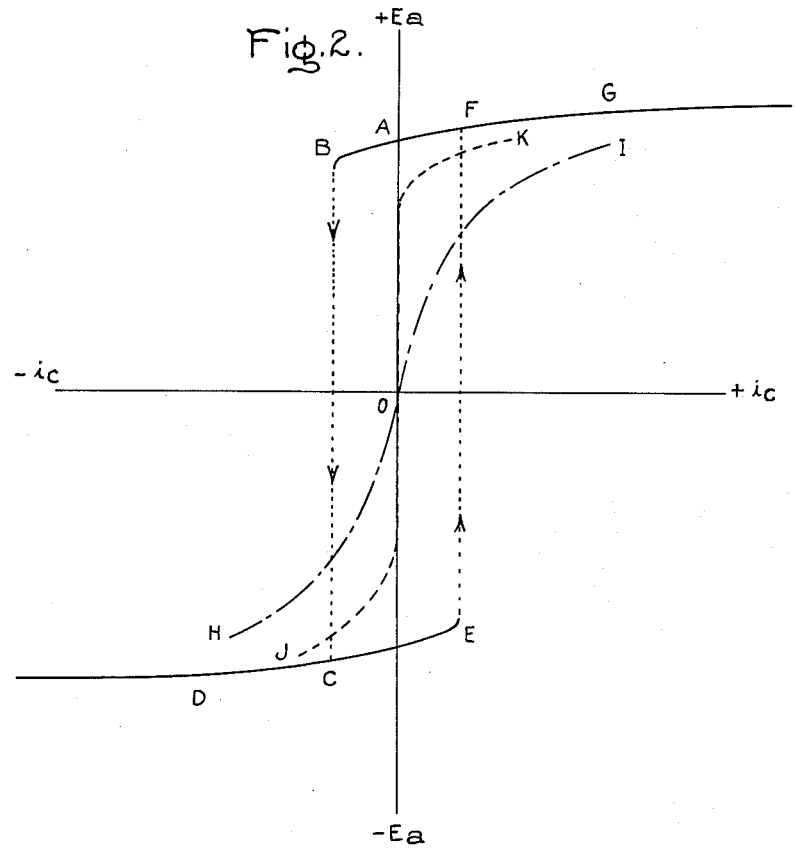
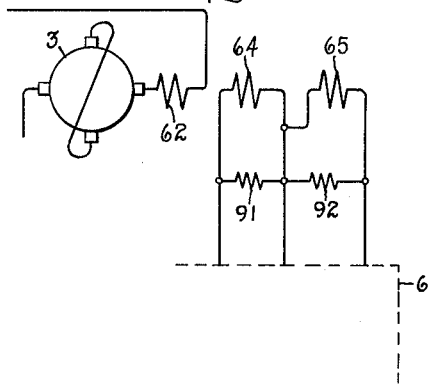
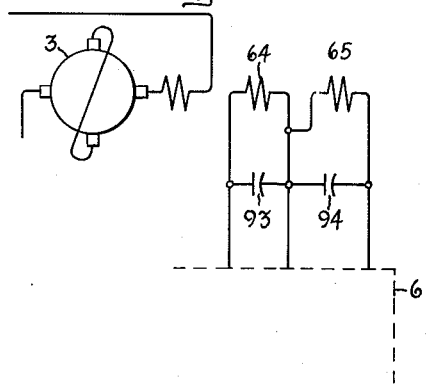
Inventor:
Herbert F. Storm,
by Claude H. Mott
His Attorney.

United States Patent Office 2,724,797
Patented Nov. 22, 1955

2,724,797

STABILIZING CIRCUIT FOR ALTERNATING CURRENT GENERATOR

Herbert F. Storm, Schenectady, N. Y., assignor to General Electric Company, a corporation of New York Application February 1, 1951, Serial No. 208,894

16 Claims. (Cl. 322—24)

This invention relates to stabilizing circuits for magnetic circuits, more particularly to stabilizing circuits for reversible flux magnetic circuits which are energized by means of magnetic amplifiers, and it has for its principal object the provision of an improved stabilizing circuit for such magnetic circuits.

More specifically, it is an object of my invention to provide a stabilizing circuit for a generator or other electrical machine having a magnetic excitation circuit provided with a pair of energizing windings which are energized in flux opposition by a pair of balanced magnetic amplifiers.

Other objects and advantages of the invention will be apparent from the subsequent description of a preferred embodiment thereof, while the scope of the invention is defined in the appended claims.

In carrying out my invention in one form, I provide a generator having a pair of differentially connected control field windings and an additional stabilizing field winding, all positioned to effect the energization of the magnetic excitation circuit of the generator. The control field windings are connected for energization by a pair of balanced magnetic amplifiers, while a circuit through the stabilizing winding is completed by connecting the two terminals together through a resistor of suitable value.

For a clearer and more complete understanding of my invention, reference should be had to the accompanying drawing, in which Fig. 1 is a diagrammatic representation of a generator voltage regulating equipment which utilizes the invention in a preferred form, Fig. 2 shows a group of curves to facilitate an understanding of the operation of my invention, and Figs. 3 and 4 are fragmentary views illustrating other embodiments of the invention.

Referring to the drawing, there is shown a generator 1, in this case illustrated as a three phase alternating current machine, the terminal voltage of which it is desired to regulate in order to maintain this voltage at a predetermined value. The excitation requirements of generator 1 are supplied by a main exciter 2 and a pilot exciter 3. Exciter 3 is illustrated in this typical equipment as a cross armature reaction excited generator, or amplidyne, of the type disclosed and claimed in Patent 2,227,992, M. A. Edwards and E. F. W. Alexanderson, granted January 7, 1941.

The regulating system for generator 1 includes, in addition to the rotating exciters 2 and 3, three principal components. These are outlined by dashed lines in the drawing and are designated generally by the numerals 4, 5 and 6. Numeral 4 refers to a comparison circuit while numerals 5 and 6 designate respectively first and second magnetic amplifier stages. The output of the second magnetic amplifier stage is applied to a pair of control fields of exciter 3 in a manner which is described in detail subsequently. The regulating system also includes other auxiliary components which are likewise described in detail subsequently.

The comparison circuit 4 includes two principal portions. One, which may be called the averaging portion, provides a current which varies directly with the average terminal voltage of generator 1, while the other portion provides a reference current. A bridge connection is utilized as illustrated, with the upper portion of the bridge providing the varying current while the lower portion provides the reference current.

The upper or averaging portion of the bridge circuit includes a three phase bridge rectifier 7 which is supplied in this typical example with a three phase voltage proportional to the terminal voltage of generator 1 by a three phase transformer 8. A fixed resistor 9 and a variable potentiometer resistor 10 are connected in series with bridge rectifier 7. The output unidirectional current from this circuit varies directly with the average three phase terminal voltage of generator 1.

The reference current portion of comparison circuit 4 includes a bridge rectifier 11 serially connected in the lower portion of the main bridge circuit with an inductor 12 and a fixed resistor 13. Rectifier 11 is supplied with current from a current standard 14 which may, for example, be a magnetic square wave type current reference such as that disclosed and claimed in application Serial No. 68,543 of B. D. Bedford, filed December 31, 1948, now U. S. Patent No. 2,636,158 which is assigned to the assignee of the present application. The current standard 14 provides a reference current which is substantially independent of variations in alternating voltage and frequency. The current standard may be energized by connection to one of the secondary windings of a single phase transformer 15 whose primary winding is connected across one phase of generator 1.

The output of the comparison circuit 4 is taken from terminals 16 and 17. This output is a direct current which varies in both direction and magnitude depending upon whether the varying current or the reference current predominates in the comparison circuit.

Magnetic amplifier stage 5 comprises a pair of balanced biphase magnetic amplifiers 18 and 19. These magnetic amplifiers are preferably of the self saturating type, which are sometimes referred to as amplistats. Each magnetic amplifier, or amplistat, includes a saturable core and each has a pair of load windings which are designated by the numerals 20 and 22 for magnetic amplifier 18 and 21 and 23 for magnetic amplifier 19. Each magnetic amplifier also includes three control windings which are designated respectively by the numerals 24, 26 and 28 for amplistat 18 and 25, 27 and 29 for amplistat 19. The saturable cores for magnetic amplifiers 18 and 19 are not illustrated in this schematic drawing but may be of the three legged type, the double toroid type or other conventional type.

The load windings of the magnetic amplifiers are supplied with alternating current from a suitable source such as a transformer 36. The load windings 20, 22, 21 and 23 are connected between taps 37 and 38 and mid-point of the secondary of transformer 36, while the primary of the transformer may be connected across one phase of generator 1 or other suitable source of alternating current.

Load windings 20 and 22 of amplistat 18 are connected respectively to opposite polarity points 37 and 38 of the transformer secondary winding, while load windings 21 and 23 of the other magnetic amplifier are similarly connected. Load windings 20 and 22 of amplifier 18 are positioned in additive flux relation on the saturable core but each of these load windings has a rectifier, preferably of the dry type, connected in series therewith so that current can flow through each load winding only during half voltage cycles of a single polarity. These rectifiers are numbered 30 for load winding 20, and 32 for load winding 22; the other amplifier acts similarly and is provided with a rectifier 31 for load winding 21 and a rectifier 33 for load winding 23. The currents in the two load windings of one magnetic amplifier saturate the core during successive halves of the alternating voltage cycle and the time during the half cycles at which saturation occurs is governed by the combined action of the three control windings on each magnetic amplifier. This, in turn, governs the current output of each individual amplifier, while the output of the complete magnetic amplifier stage is a result of the differential action of the two individual magnetic amplifiers.

In view of the fact that the magnetic amplifier stage 5 supplies an inductive load, namely the magnetic amplifier stage 6, a pair of shunt rectifiers 34 and 35 are provided to by-pass the inductive load current from the load circuit during the intervals when the load windings of the magnetic amplifiers are not conducting.

The second magnetic amplifier stage 6 is similar to stage 5 except that the components making up this stage are larger because of the larger amounts of energy handled. In addition, an additional control winding is provided for each of the magnetic amplifiers in this stage.

Thus, stage 6 comprises two magnetic amplifiers 40 and 41. Magnetic amplifier 40 has load windings 42 and 44 and control windings 46, 48, 50 and 52. The other magnetic amplifier 41 has load windings 43 and 45 and control windings 47, 49, 51 and 53. Rectifiers 54, 56, 55 and 57 are connected in series with the load windings, while shunt rectifiers 58 and 59 are again provided to by-pass the inductive load current resulting from the inductive load supplied by this magnetic amplifier stage, this load being two of the control fields of generator 3.

Generator 3, as illustrated in this typical case, is provided with four field windings which are designated respectively by the numerals 62—65 inclusive. Field winding 62 is a compensating field winding. Winding 63 is a stabilizing winding. Windings 64 and 65 are control field windings and are supplied with current by the second magnetic amplifier stage 6.

The output of generator 3 is utilized to add to or subtract from shunt connected self-excitation field winding 66 of main exciter 2, while the current output of the latter exciter is utilized in energizing the field winding 67 of generator 1.

In operation, a unidirectional current which is approximately proportional to the average three phase terminal voltage of generator 1 is produced by the averaging circuit comprising transformer 8 and three phase bridge rectifier 7. This current flows through resistors 9 and 10 to terminal 17 of the comparison circuit 4, thence through a potentiometer resistor 68 and through serially connected control windings 24 and 25 on amplistats 18 and 19 from which the circuit is completed through a connection back to terminal 16 of the comparison circuit 4 and thence back to bridge rectifier 7. This current is opposed by a reference current from bridge rectifier 7 which flows out through terminal 16, through saturating windings 25 and 24 of magnetic amplifier stage 5 and back through variable resistor 68, terminal 17, resistor 13 and reactor 12 to bridge rectifier 11 to complete the circuit. The net current through windings 24 and 25 is equal in magnitude to the difference between these two currents, while the direction of the net current depends upon which portion of the comparison circuit 4 predominates. Thus, a direct current flows through windings 24 and 25 the direction and magnitude of which depends upon the sense and magnitude by which the average terminal voltage of generator 1 varies from a predetermined voltage corresponding to the reference current provided by current standard 14.

The magnetic amplifiers 18 and 19 which comprise the first amplifier stage, are balanced one against the other in what is sometimes referred to as a push-pull connection. Saturating windings 24 and 25, as indicated schematically on the drawing, act in opposite senses on their respective cores, that is, a current through these control windings which increases the presaturation of the core of amplistat 18 simultaneously decreases the presaturation of the core of amplistat 19 and vice versa. Thus, a differential action is produced which provides a very high amplification by amplifier stage 5.

By means of conductors 70 and 71 and center tap conductor 69, the output currents of the two magnetic amplifiers making up stage 5 are circulated respectively through control windings 46 and 47 of magnetic amplifier stage 6.

Amplifier stage 6 acts in a similar manner to stage 5 to produce two differentially acting output currents which are circulated through control fields 64 and 65 of amplidyne generator 3. Amplistat 40 supplies current for energizing field winding 64 while amplistat 41 supplies current for energizing field winding 65. The field windings 64 and 65 are sometimes referred to as buck and boost control fields. The magnetomotive forces of these two windings oppose each other as indicated by the arrows about these windings in Fig. 1. One of them produces a voltage at the terminals of generator 3 which subtracts from or bucks the energizing voltage for winding 66 while the other produces a voltage which adds to or boosts this energizing voltage. In the present instance, winding 64 is the buck winding and winding 65 is the boost winding.

If the terminal voltage of generator 1 is at the desired value which the regulator is to maintain, there is no current flowing in control windings 24 and 25 of the first magnetic amplifier stage because the two currents produced by the comparison circuit 4 counteract each other. Under this condition there are equal and opposite currents flowing in control windings 46 and 47 of the second magnetic amplifier stage and equal currents flowing in control field windings 64 and 65 of amplidyne 3. Windings 64 and 65, therefore, counteract each other with the result that amplidyne 3 neither bucks nor boosts winding 66.

If the terminal voltage of generator 1 varies from the predetermined value which it is desired to maintain, the regulating system immediately acts to restore the terminal voltage to the predetermined value. If the voltage rises, for example, the current output of the upper portion of comparison circuit 4 exceeds the reference current provided by the lower portion of the comparison circuit and a current equal to the difference between these two currents circulates through windings 24 and 25 of amplifier stage 5. This current increases the presaturation of the core and thereby increases the output of one of the magnetic amplifiers, which may be amplistat 18, for example, and simultaneously decreases the output of the other amplistat, number 19, by reducing the presaturation of its magnetizable core. The resulting currents from amplistats 18 and 19 produce opposite effects upon amplistats 40 and 41, that is, the current through control winding 46 of the former increases its output current while the reduced current through control winding 47 of amplistat 41 decreases the output of this amplistat. The output currents of amplistats 40 and 41 respectively increase the effect of buck field 64 in the amplidyne and decrease the effect of boost field 65. Both of these simultaneous actions decrease the excitation of generator 3, which reduces its output voltage. This reduction in voltage acting on field winding 66 of exciter 2 reduces the main generator terminal voltage until the desired predetermined value is again restored.

When the system thus far described is put into use as a voltage regulator, I have found that a disturbance which may be called snap action occurs in the output of the second amplistat stage. This snap action not only makes the gradual control of amplidyne voltage impossible, but in addition causes hunting. This disturbance is apparently due to the characteristics resulting from the connection of the balanced magnetic amplifiers with the generator control fields in the manner shown.

This snap action is illustrated diagrammatically in Fig. 2 of the drawing. Assume, for example, that the zero point on this diagram represents the normal zero output voltage of exciter 3 corresponding to the predetermined regulated terminal voltage of generator 1, with output voltages above and below this normal value for exciter 3 being plotted respectively along the positive and negative vertical or ordinate axes of this graph. The zero point on the graph of Fig. 2 also represents the balanced point of the comparison circuit 4, while the negative horizontal axis or abscissa represents a predominance of the variable current from the averaging circuit over the reference current and the positive abscissa represents a predominance of the reference current over the variable current.

Assume, for purposes of explanation, that the output voltage of exciter 3 is too high, as illustrated by point A, and it is desired to reduce this output voltage by an appropriate change in the current output from the comparison circuit 4. As such a change is made in the current output of the comparison circuit, the voltage of generator 3 moves along the curve to point B until suddenly for the smallest further change in current from the comparison circuit the voltage of generator 3 suddenly drops to point C. A further change in the same direction in the current from the comparison circuit changes the voltage of exciter 3 to point D. If the current output of the comparison circuit is then reversed in direction to move the exciter voltage back along the curve to point C, the current continues to increase until point E is reached at which point a sudden increase in exciter voltage takes place to point F. A further increase in current from the comparison circuit in this direction moves the exciter voltage on to point G. Thereafter, the current from the comparison circuit will again change direction and move the exciter voltage back to point A, after which the cycle just described is repeated. Thus, the voltage of exciter 3 will oscillate about the zero point but will never reach it. As a result, the terminal voltage of alternator 1 will be subject to severe and unacceptable hunting.

It will be understood that the flux in the magnetic excitation circuit of amplidyne 3 reverses each time that the armature voltage of this machine reverses as described above. I have found that such flux reversals and the undesirable voltage oscillations of the amplidyne can be completely eliminated, and satisfactory regulation of the main generator obtained, by adding to the amplidyne generator 3 an additional field winding 63 and connecting the two terminals of this winding together through a shunt resistor which is designated on the drawing by the numeral 72. The characteristic curve then becomes H–O–I as shown in Fig. 2 and is a single valued function. This results in proper operation of the voltage regulator system without hunting or oscillation.

I have found further that as the value of resistor 72 is increased, the characteristic curve steepens in the center and it is possible with sufficient resistance to obtain almost an infinite gain near the center operating point of the characteristic curve as illustrated by the curve J–O–K.

I have observed that if either amplistat 40 or amplistat 41 is disconnected from its respective amplidyne control field winding, that the other amplistat will produce an amplidyne armature voltage completely free of snapping. The difficulty encountered when winding 63 is not used, therefore, can be clearly related to the combined action of the two balanced magnetic amplifiers on the magnetic excitation circuit of the amplidyne generator.

It is my belief that the effect of winding 63 on generator 3 is to reduce or cancel the even harmonics which are produced in the magnetic excitation circuit of this generator by the combined action of magnetic amplifiers 40 and 41. Winding 63 does this by carrying currents which, according to Lenz's law, counteract these even harmonic magnetic flux components.

It may be pointed out that it is possible merely to short-circuit the two terminals of winding 63 and omit variable resistor 72 entirely if response time is not a factor in the regulator system or other circuit with which the invention is used. Response time is generally an important factor, however, particularly in generator voltage regulators as here illustrated, and it is possible to reduce the time constant of the magnetic excitation circuit of generator 3 and thereby reduce the response time of the entire regulating system by introducing resistance in the circuit with winding 63.

Time delay is inherent in the magnetic excitation circuit of a dynamoelectric machine because of the inductance of the various field windings. Introducing an increased amount of resistance in circuit with the stabilizing field winding reduces the percentage of the contributing time constant of this winding to the total time constant of the excitation system, it being understood that the latter is the sum of the time constants of the individual windings. The time constant of a single winding is decreased by increasing the amount of resistance connected in shunt therewith, thus reducing the proportion of the inductance of the winding to the sum of inductance and resistance.

An increase in the resistance 72 of the stabilizing circuit represented by field winding 63 and resistance 72 also reduces the current in this circuit, however, and, therefore, reduces the effectiveness of winding 63 in stabilizing the regulating system. If too much resistance 72 is inserted, snap action of the second amplistat stage and hunting of the main generator terminal voltage, similar to that experienced when field winding 63 is not used, only not so pronounced, will be resumed. In general, it is desirable to use the maximum amount of resistance in circuit with the stabilizing winding which will not result in such snap action and hunting, as this will provide the most rapid regulator action.

In addition to the elements and components hereinbefore described, the regulating system illustrated in the accompanying drawing also includes other features, some of which may be omitted in certain cases.

One such feature, which is desirable in many voltage regulators for alternating current generators, is an arrangement for providing a lower limit of generator field excitation in order to prevent the generator from pulling out of synchronism under abnormal conditions. One circuit which is suitable for this purpose is disclosed and claimed in U. S. Patent 2,472,571, Crary, granted June 7, 1949. Such a circuit is indicated in Fig. 1 by the numeral 73. In operation, circuit 73 provides a current at the appropriate time which produces a corresponding change in the reference current provided by current standard 14 and thereby affects the operation of the voltage regulating system to prevent too great a reduction in the excitation of generator 1. It will be understood, of course, that circuit 73 may be provided with suitable electrical connections (not shown) to the terminal conductors of generator 1 to enable this circuit to provide the desired action.

As illustrated in Fig. 1, the regulating system is provided with a balancing adjustment for the saturating windings 24 and 25 of the first amplifier stage to provide means for balancing the output currents of the second amplifier stage when output current from the comparison circuit 4 is zero. Such an adjustment may be necessary because of differences in characteristics of the individual component parts making up the two amplifier stages.

This balance adjustment includes three serially connected resistors made up of two fixed resistors 74 and 75 and a variable potentiometer resistor 76. A bridge type full wave rectifier 77 which may be supplied with alternating current from a secondary winding of transformer 15 has its unidirectional current terminals connected to the slider of potentiometer resistor 76 and to terminal 78 at which control windings 24 and 25 are joined.

In the comparison circuit 4, the potentiometer 10 provides means for adjusting the voltage which the regulating system maintains, while potentiometer 68 provides for the adjustment of the sensitivity of the regulator.

In addition to control windings 24 and 25, magnetic amplifiers 18 and 19 are provided with stabilizing windings 26 and 27 which are connected to oppose respectively any changes produced in the outputs of the magnetic amplifiers by current changes in windings 24 and 25. Stabilizing windings 26 and 27 are serially connected to the secondary of a stabilizing transformer 79 the primary of which is connected to the output terminals of exciter 2. As will be understood by those skilled in the art, transformer 79 transmits a stabilizing current to windings 26 and 27 only under transient conditions when a change is taking place in the excitation of generator 1 as a result of a change in current in windings 24 and 25, inasmuch as the current in the circuit connecting the output terminals of exciter 2 and field winding 67 of the main generator is a unidirectional current. This stabilizing circuit aids in stabilizing and preventing overshooting of the voltage of generator 1.

If desired, amplifier stage 5 may also be provided with a pair of negative feed-back windings 28 and 29. As is usual in such cases, these windings have the effect of reducing the output current of the amplifier stage. These windings also have the additional effects of increasing the linearity of the characteristic curve of this amplifier stage and at the same time decreasing the time of response. These effects of the negative feed-back windings are the usual ones and will be readily understood by those familiar with such windings.

Magnetic amplifier stage 6 is similar to the preceding magnetic amplifier stage in that it includes stabilizing windings 50 and 51 which are connected to the secondary of a stabilizing transformer 80. The primary of the latter transformer is connected to the output terminals of the pilot exciter 3. The operation of this stabilizing circuit is similar to the stabilizing circuit for the preceding stage except that it derives its signal from changes in the excitation circuit for field winding 66 for main exciter 2 which is regulated by pilot exciter 3. Magnetic amplifier stage 6 may also include negative feed-back windings 52 and 53 which operate in similar manner to windings 28 and 29 on the previous stage.

In addition to the three sets of control windings already described for amplifier stage 6, this stage also includes bias windings 48 and 49. The purpose of these windings is to adjust the operating points of the individual amplistats 40 and 41 so that they will respond linearly to changes in control signal currents. These windings are supplied with current from a bias circuit which includes three serially connected resistors, two of which are fixed resistors 81 and 82 while the third is a variable potentiometer resistor 83. A bridge type full wave rectifier 84, which receives alternating current from transformer 15 has its unidirectional output current terminals connected respectively to the slider of potentiometer 83 and to terminal 85 at which windings 48 and 49 are connected together.

Another form of my invention is illustrated in Fig. 3 of the accompanying drawing. In this figure, corresponding elements bear the same reference numerals as in Fig. 1. In this embodiment, winding 63 has been eliminated from amplidyne 3, and a pair of resistors 91 and 92 have been added in shunt respectively with field windings 64 and 65. These two field windings are still supplied by balanced magnetic amplifier stage 6 in the same manner as in Fig. 1.

In the embodiment illustrated in Fig. 3, the resistors 91 and 92 are normally provided with the maximum value of resistance which will not result in flux oscillations in the magnetic excitation circuit of amplidyne 3 and the consequent snapping of the armature voltage of this machine. The circuit shown in Fig. 3 can be used to produce as good stabilizing action as that of Fig. 1, however, it is not generally as desirable because of the continuous load imposed by resistors 91 and 92 on amplifier stage 6.

Still another form of the invention is illustrated in Fig. 4 of the drawing, in which a pair of capacitors 93 and 94 have been substituted for resistors 91 and 92 of the preceding figure. These capacitors apparently shunt the currents resulting from the even harmonic components of the output voltage waves of amplifier stage 6 and thereby provide a stabilizing action similar to that provided by the circuits of Fig. 1 and Fig. 3.

While I have described in the foregoing a stabilizing circuit for a generator, my invention is not limited to a generator but is useful for any magnetic circuit in which a pair of balanced magnetic amplifiers are utilized for controlling the flux in the magnetic circuit and in which the magnetic flux must be reversed. It should be understood, therefore, that the invention is not limited to the specific embodiment described and illustrated herein. Modifications of the invention may be made and I intend to cover by the appended claims all such modifications which fall within the true spirit and scope of my invention.

What I claim as new and desire to secure by Letters Patent of the United States is:

1. In combination, a magnetic circuit having a pole structure, at least two inductively coupled windings mounted on said structure for controlling the magnetic flux therein, a pair of alternating voltage supply terminals, a pair of oppositely acting magnetic amplifiers supplied from said alternating voltage terminals and having alternating voltage components in their outputs and each connected to a different one of said windings for energizing them in flux opposition, and a shunt resistor connected between the terminals of at least one of said windings.

2. A reversible flux magnetic structure having a pole member, three inductively coupled windings mounted on said pole member for controlling the magnetic flux therein, a pair of alternating voltage supply terminals, a pair of push-pull connected magnetic amplifiers supplied from said alternating voltage terminals and having alternating voltage components in their outputs and each connected to a different one of said windings for energizing them in flux opposition, a passive network including the third of said windings and a resistor connected between the terminals of said third winding for completing a circuit therethrough.

3. In combination, a reversible flux magnetic circuit having a pole member, at least two inductively coupled windings mounted on said pole member for affecting the flux therein, a pair of alternating voltage supply terminals, a pair of oppositely acting magnetic amplifiers supplied from said terminals and having alternating voltage components in their outputs connected respectively to two of said windings for energizing them in flux opposition, and a pair of resistors connected respectively in shunt with said flux affecting windings.

4. In combination, a reversible flux magnetic circuit having a pole member, at least two inductively coupled windings mounted on said pole member for affecting the flux therein, a pair of alternating voltage supply terminals, a pair of oppositely acting magnetic amplifiers supplied from said terminals and having alternating voltage components in their outputs connected respectively to two of said windings for energizing them in flux opposition, and a pair of resistors connected respectively in shunt with said windings, said resistors having the maximum value of resistance which will not produce oscillation of the flux in said magnetic circuit.

5. In combination, a reversible flux magnetic circuit having a pole structure, at least two inductively coupled windings mounted on said pole structure for affecting the flux therein, a pair of alternating voltage supply terminals, a pair of oppositely acting magnetic amplifiers supplied from said terminals and having alternating voltage components in their outputs connected respectively to two of said windings for energizing them in flux opposition, and a pair of capacitors connected respectively in shunt with said windings.

6. In combination, a reversible flux magnetic circuit having a pole structure, three inductively coupled windings mounted on said pole structure for affecting the flux therein, a pair of alternating voltage supply terminals, a pair of self saturating magnetic amplifiers in push-pull connection supplied from said supply terminals and having alternating voltage components in their outputs arranged to energize respectively two of said windings in flux opposition, means for simultaneously oppositely varying the outputs of said magnetic amplifiers, and a passive circuit including the third of said windings and a resistor connected between the terminals of the third winding.

7. In combination, a reversible flux magnetic circuit structure having a pole member, three inductively coupled windings mounted on said pole member for affecting the flux therein, a pair of alternating voltage supply terminals, a pair of self saturating magnetic amplifiers in push-pull connection supplied from said alternating voltage terminals and having alternating voltage components in their outputs arranged to energize respectively two of said windings in flux opposition, means for simultaneously oppositely varying the outputs of said magnetic amplifiers, and a passive circuit including the third of said windings and a resistor connected between the terminals of the third winding, said resistor having the largest value of resistance which will not result in abrupt flux changes in said magnetic circuit.

8. In combination, a dynamoelectric machine having a magnetic circuit structure provided with a field pole member and at least three inductively coupled field windings mounted on said member, a pair of alternating voltage supply terminals, a pair of balanced magnetic amplifiers supplied from said alternating voltage terminals and having alternating voltage components in their outputs connected respectively to two of said field windings to energize them in flux opposition, and a passive network including the third of said windings and connections between the terminals of the third field winding to complete a circuit therethrough.

9. In combination, a generator having a magnetic structure provided with a field pole member and three inductively coupled field windings mounted on said member, a pair of alternating voltage supply terminals, a pair of balanced magnetic amplifiers each having a saturable core and each supplied from said terminals and having an alternating voltage component in its output, connections to a source of saturating currents arranged to oppositely affect the saturation of said cores thereby to oppositely affect the output currents of said magnetic amplifiers, said magnetic amplifiers being connected respectively to two of said field windings to energize them in flux opposition, and a passive circuit including the third of said field windings and a resistor connected between the terminals of the third field winding.

10. In combination, a generator having a magnetic circuit structure provided with a field pole member and three inductively coupled field windings mounted on said pole member, a pair of alternating voltage supply terminals, a pair of balanced magnetic amplifiers each having a saturable core and each supplied from said terminals and having an alternating voltage component in its output, connections to a source of saturating currents arranged to oppositely affect the saturation of said cores thereby to oppositely affect the output currents of said magnetic amplifiers, said magnetic amplifiers being connected respectively to two of said field windings to energize them in flux opposition, and a passive circuit including the third of said field windings and a resistor connected between the terminals of the third field winding, said resistor having the maximum value of resistance which will not result in oscillation of the output voltage of said generator.

11. In combination, a generator having a magnetic structure provided with a field pole member and having at least three inductively coupled field windings mounted thereon, a pair of alternating voltage supply terminals, a pair of balanced magnetic amplifiers, each having a saturable core, and at least one load winding and a control winding, and each supplied from said alternating voltage supply terminals and having an alternating voltage component in its output, connections to a source of saturating currents for energizing said control windings to simultaneously and oppositely affect the saturation of the respective cores upon variation in said saturating currents, said load windings being connected respectively to two of said field windings to energize them in flux opposition, and a passive network including the third of said field windings and a resistor connected between the terminals of said third field winding to complete a circuit therethrough.

12. In combination, an amplidyne generator having a magnetic circuit structure provided with a field pole member and three inductively coupled control field windings mounted on said pole member, a pair of alternating voltage supply terminals, a pair of balanced self-saturating magnetic amplifiers each having a saturable core and a control winding and a pair of load windings, each load winding having a rectifier in series therewith, connections to said alternating voltage terminals for energizing said load windings whereby an alternating voltage component is produced in the circuit of each of said load windings, said rectifiers being arranged so that each pair of load windings for one amplifier conducts current alternately during successive half cycles of said alternating potential, connections to a common source of saturating currents for energizing said control windings to simultaneously oppositely affect the presaturation of said saturable cores, the load windings of said magnetic amplifiers being connected respectively to two of said control field windings to energize them in flux opposition, and a passive circuit including the third of said field windings and a resistor connected between the terminals of the third control field winding.

13. In a voltage regulating system, a dynamoelectric machine having a magnetic structure provided with a pole member and three inductively coupled field windings mounted on said pole member, a pair of alternating voltage supply terminals, a pair of balanced magnetic amplifiers supplied from said terminals and having alternating voltage components in their outputs connected respectively to two of said field windings to energize them in flux opposition, means for deriving a current responsive to the voltage of said system, means for deriving a reference current, means responsive to the difference between said currents for affecting the output currents of said magnetic amplifiers, and a passive circuit including the third of said field windings and connection means for joining the terminals of said third field winding.

14. In a voltage regulating system for a generator, an exciter having a magnetic circuit structure provided with a pole member and having three inductively coupled field windings mounted on said pole member, a pair of alternating voltage supply terminals, a pair of balanced magnetic amplifiers supplied from said alternating voltage terminals and having alternating voltage components in their outputs connected respectively to two of said field windings to energize them in flux opposition, a pair of control windings positioned respectively on said magnetic amplifiers in oppositely disposed flux producing relation, means for deriving a current responsive to the voltage of said generator, means for deriving a reference current, means responsive to the difference between said currents for varying the currents in said control windings whereby the output currents of said magnetic amplifiers are varied simultaneously and oppositely, and a passive network including the third of said field windings and a resistor connected between the terminals of said third field winding.

15. In a voltage regulating system for a generator, an exciter having a magnetic structure provided with a pole member and having three inductively coupled field windings mounted on said pole member, a pair of alternating voltage supply terminals, a pair of balanced magnetic amplifiers supplied from said alternating voltage terminals and having alternating voltage components in their outputs connected respectively to two of said field windings to energize them in flux opposition, a pair of control windings positioned respectively on said magnetic amplifiers in oppositely disposed flux producing relation, means for deriving a current responsive to the voltage of said generator, means for deriving a reference current, means responsive to the difference between said currents for varying the currents in said control windings whereby the output currents of said magnetic amplifiers are varied simultaneously and oppositely, and a passive circuit including the third of said field windings and a resistor connected between the terminals of said third field winding, said resistor having the maximum value of resistance which will not produce hunting of said generator voltage.

16. In a voltage regulating system for an alternating current generator having a self-excited rotating exciter, an amplidyne having a magnetic circuit structure provided with a field pole member and having three inductively coupled control field windings mounted on said pole member and arranged to buck and boost the excitation of said exciter, a pair of alternating voltage supply terminals, a pair of self saturating magnetic amplifiers in push-pull connection supplied from said alternating voltage terminals and having alternating voltage components in their outputs arranged to energize respectively two of said control field windings in flux opposition, a pair of control windings positioned respectively on said magnetic amplifiers and arranged to simultaneously oppositely affect the saturation of said magnetic amplifiers, means for deriving a current responsive to the voltage of said generator, means for deriving a reference current, means responsive to the difference between said currents and including an additional magnetic amplifier stage for simultaneously varying the currents in said control windings whereby the output currents of said magnetic amplifiers are varied simultaneously and oppositely to affect the excitation of said amplidyne and thereby affect the excitation of said exciter, and a passive network including said third field winding and a resistor connected between the terminals of said third control field winding to complete a circuit therethrough and provide for the circulation of stabilizing currents therein.

References Cited in the file of this patent

UNITED STATES PATENTS

| | | |
|---|---|---|
| 2,414,936 | Edwards et al. | Jan. 28, 1947 |
| 2,475,575 | Tweedy | July 5, 1949 |
| 2,477,729 | FitzGerald | Aug. 2, 1949 |
| 2,525,451 | Graves | Oct. 10, 1950 |
| 2,600,308 | Lund et al. | June 10, 1952 |